US006786396B2

(12) United States Patent
Constantine

(10) Patent No.: US 6,786,396 B2
(45) Date of Patent: Sep. 7, 2004

(54) COMBINED BAR CODE AND SCANTRON INDICIA SCHEME FOR GOLF SCORE CARD AND INCLUDING HANDICAP UPDATE CAPABILITIES

(76) Inventor: Theodore Constantine, 34234 W. 7 Mile Rd., Livonia, MI (US) 48152

( * ) Notice: Subject to any disclaimer, the term of this patent is extended or adjusted under 35 U.S.C. 154(b) by 38 days.

(21) Appl. No.: 10/213,803

(22) Filed: Aug. 6, 2002

(65) Prior Publication Data

US 2004/0026493 A1 Feb. 12, 2004

(51) Int. Cl.[7] .............................................. G36F 17/00
(52) U.S. Cl. .................... 235/375; 235/462.01; 235/487
(58) Field of Search ........................... 235/375, 462.01, 235/487

(56) References Cited

U.S. PATENT DOCUMENTS

| 3,665,494 | A |   | 5/1972  | Baumoel ..................... 235/156 |
| 4,068,972 | A |   | 1/1978  | Stuart ............................ 283/49 |
| 4,142,236 | A |   | 2/1979  | Martz et al. ................. 364/411 |
| 4,268,744 | A |   | 5/1981  | McGeary ..................... 235/375 |
| 4,319,131 | A |   | 3/1982  | McGeary et al. ........... 235/375 |
| 4,331,425 | A | * | 5/1982  | Davis, Jr. .................... 434/252 |
| 4,367,526 | A |   | 1/1983  | McGeary et al. ........... 364/411 |
| 4,666,157 | A | * | 5/1987  | Bodine et al. ............... 473/407 |
| 4,745,875 | A |   | 5/1988  | Timleck ....................... 116/222 |
| 4,868,375 | A | * | 9/1989  | Blanford ................. 235/462.15 |
| 4,910,677 | A |   | 3/1990  | Remedio et al. ............ 364/410 |
| 5,094,451 | A |   | 3/1992  | Glamack ................... 273/32 H |
| 5,127,044 | A |   | 6/1992  | Bonito et al. ................. 379/88 |
| 5,265,875 | A | * | 11/1993 | Fitzgerald .................... 473/169 |
| 5,314,208 | A | * | 5/1994  | Strickland .................... 283/116 |
| 5,487,542 | A |   | 1/1996  | Foley .................... 273/176 FA |
| 5,504,312 | A | * | 4/1996  | Morrison et al. ........... 235/375 |
| 5,507,485 | A |   | 4/1996  | Fisher ....................... 273/32 R |
| 5,536,010 | A |   | 7/1996  | Lambourne .................. 364/411 |
| 5,562,550 | A |   | 10/1996 | Chartrand .................... 473/131 |
| 5,611,574 | A |   | 3/1997  | Desjardins .................... 283/49 |
| 5,681,108 | A |   | 10/1997 | Miller ......................... 364/411 |
| 5,683,303 | A |   | 11/1997 | Lambourne ................. 473/131 |
| 5,740,077 | A |   | 4/1998  | Reeves ........................ 364/561 |
| 5,795,237 | A |   | 8/1998  | Miyamoto .................... 473/13 |
| 5,949,679 | A |   | 9/1999  | Born et al. ............... 364/410.1 |
| 6,074,312 | A |   | 6/2000  | Lyon et al. .................. 473/409 |
| 6,246,917 | B1|   | 6/2001  | Smith et al. .................. 700/92 |
| 6,293,868 | B1| * | 9/2001  | Bernard ........................ 463/42 |
| 6,461,245 | B1| * | 10/2002 | Morgan ....................... 473/131 |

OTHER PUBLICATIONS

"Handy information for your handicap." Michigan Links, p. 7, Dec./Jan. 2002.

* cited by examiner

Primary Examiner—Diane I. Lee
Assistant Examiner—Seung H Lee
(74) Attorney, Agent, or Firm—Gifford, Krass, Groh, Sprinkle, Anderson & Citkowski, P.C.

(57) ABSTRACT

An inputtable and readable scheme for use with a score card utilized in combination with a golf course competition event. A first plurality of inputtable fields each correspond to an individual golf course hole. A second field is associated with a golf course identity and location, said second field further typically including a bar code assigned to the golf course. One or more third fields are associated with a participant identity and include a selection of either again a bar code identifier or a plurality of alpha-numeric input fields. The score card, upon completion of said first, second and third fields, is inputted into an appropriate and electro-optical card reader device for calculating the participant's score and handicap.

10 Claims, 3 Drawing Sheets

COMBINED BAR CODE AND SCANTRON INDICIA SCHEME FOR GOLF SCORE CARD AND INCLUDING HANDICAP UPDATE CAPABILITIES

BACKGROUND OF THE INVENTION

1. Field of the Invention

The present invention relates generally to computer readable indicia schemes, particularly those suited for use with bar code scanning devices. Specifically, the present invention teaches a combined bar code labeled and Scantron®-type inputtable indicia scheme for use in filling in a golf score card. The completed score card, upon being inputted into an appropriate type of card reader device, provides the combined features of being able to immediately identify the golf course played (via the bar code), as well as quickly and efficiently tallying the golfer's score and revising the golfer's handicap.

2. Description of the Prior Art

The prior art is well documented with examples of coded data recording, storing and readout devices. The objective in each instance is to provide a means for more conveniently and effectively recording, storing and retrieving information.

Morrison, U.S. Pat. No. 5,504,312 discloses a scoring system which compiles a set of statistics based upon given set of sport or performance data. Coded data items are contained in a predetermined format and, in turn, a card reader inputs and converts the coded data items into electrical signals, which are in further turn processed into a plurality of statistical categories, such as score per hole, total score, number of lost balls, number of putts and other hazards, etc., and then outputted in a user-selected manner. Morrison further specifically recites the use of a score card and card reader and further suggests bar coding capability, see column 3, lines 18–38 of the detailed disclosure.

U.S. Pat. No. 5,611,574, issued to Desjardins, teaches a golf scorecard for totaling a player's score and with the need for a writing instrument. The scorecard includes one or more series of consecutive numbers printed thereon and along a predetermined pattern. Each of the numbers is concealed by formation made of a coating and opaque material adherable to the scorecard and capable of being removed by scraping a rubbing to reveal the number thereunder. When in use, a user scrapes only those formations indicative of a score made on each consecutive hole of a game of golf by adding consecutive formations from the last scraped formation until it totals his score on every hole. The numbers identified under the formations that are scraped reveal the cumulative golf score at each consecutive hole of the game of golf. In particular, the scorecard is for use with a miniature golf putting course.

Additional golf scoring systems of note are set forth in Smith, U.S. Pat. No. 6,246,917 and Born, U.S. Pat. No. 5,949,679. Smith '917 teaches the use of a smart card usable to open an electronic record with a master facility. The facility receives, stores, calculates and reports play related data in a real time manner. Born '679 teaches a main/central computer and remote computers associated with each of a number of different golf courses. Each remote computer is associated with a hole on the golf course and coupled to the main computer via a communications network. Each remote computer further receives a raw score for each golf participant playing the associated hole, calculates local competition scores for the associated holes for each participant, and communicates the score to the host computer.

Bonito, U.S. Pat. No. 5,127,044 teaches an automatic golf scoring and scheduling system and including a first subsystem installed on a golf cart or carried manually, a handicap subsystem at a fixed location (clubhouse) and a portable data memory device for transferring data between the scoring subsystem and handicap subsystem. Interface capabilities include player identification means, scoring and handicap subsystems.

Both Lyon, U.S. Pat. No. 6,074,312, and McGeary, U.S. Pat. No. 4,268,744, teach score processing and handicap systems which employ smart cards having magnetically encoded data. Chartrand, U.S. Pat. No. 5,562,550, teaches a multimedia golf handicap interactive touch-screen system with a CPU, touch screen monitor, electronic card and card reader/writer module. Unlike in the invention, the information in Chartrand is keyed in using the touch screen associated with the system.

SUMMARY OF THE PRESENT INVENTION

The present invention is a combined bar code labeled and Scantron®-type inputtable indicia scheme for use in filling in a golf score card and which is a non-obvious improvement over the several prior art references disclosed above. In particular, the golf card scoring scheme of the present invention provides, upon completion of the score card, the ability of being inputted into an appropriate type of card reader device and providing the combined features of being able to immediately identify the golfer (via alphanumeric entry fields or bar code assignment), the course played (typically via the bar code), as well as quickly and efficiently tallying the golfer's score using the Scantron® type fields employed. In this manner, the present invention provides an improved indicia imprintable scheme for accomplishing case of scoring and tallying of scores and handicaps, such further providing greater, more reliable, and more streamlined processing and tallying of scores in golf competition events, both professional and amateur, as well as in league play.

The present invention typically includes a first plurality of inputtable fields, each of which corresponds to a subset score achieved on an individual portion of the competition event hole. In the preferred application, each of the first plurality of inputtable fields further includes a plurality of indicia imprintable and numerical representations corresponding to a golf course hole. Indicia imprinting of a subset of the numerical representations corresponds to an achieved score for each of the first plurality of fields. In order to minimize, to the extent practicable, the number of numerical representations needed, one or more of a subset number of non-consecutive representations may be inscribed to cumulate a numerical representation corresponding to a score for the golf hole and further such as is accomplished by establishing representations for 1, 2, 4, and 8, and as opposed for example by listing each of 1, 2, 3, 4, 5, 6, 7, 8, 9, 10 for the given hole.

The score cord and inputtable scheme includes a second field associated with a golf course identity and location, the second field further typically provided as a bar code assigned to the golf course. At least one third field is associated with a participant identity and includes again either such as a bar code identifier or a plurality of individual and alpha-numerical input fields for establishing and identifying a golfer/participant's name and/or password. A fourth inputtable field is provided in the form of an overall yardage parameter associated with the golf course, such further typically known as one of the "blue", "white" or "red" tees (as well as gold and black tees).

The score card, upon completion of each of the required fields, is inputted into an appropriate and electro-optical card reader device for calculating the participant's overall score and handicap. In this fashion, scoring of the player's tally is more quickly and reliably established and the multi-inputtable nature of the score card permits for easier compilation and output of information for such as professional and amateur sporting events.

BRIEF DESCRIPTION OF THE DRAWINGS

Reference will now be made to the attached drawings, when read in combination with the following detailed description, wherein like reference numerals refer to like parts throughout the several views, and in which.

DESCRIPTION OF THE PREFERRED EMBODIMENTS

Figure 1:
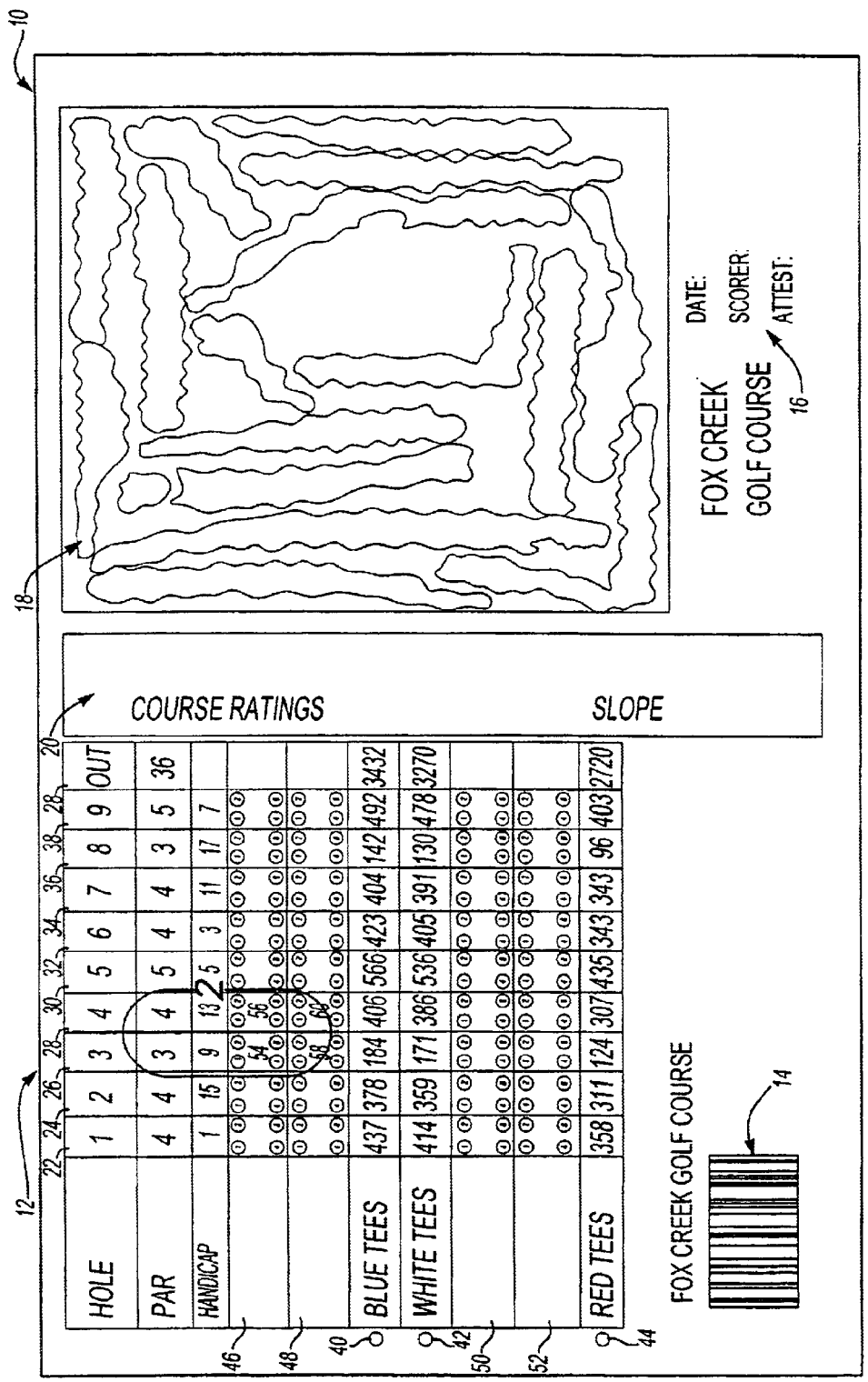
FIG. 1 is a plan view of the golf score card according to a first preferred embodiment of the present invention.

Referring now to FIG. 1, the present invention teaches a combined bar code labeled and Scantron®-type inputtable indicia scheme 10 for use in filling in a golf score card. As previously described, and upon being completed, the score card is inputted into an appropriate type of card reader device and provides the combined features of being able to immediately identify the golf course played (via the bar code), as well as quickly and efficiently tallying the golfer's score and revising the golfer's handicap.

Referring again to FIG. 1, the score card includes a plurality of individual portions, including among them a first portion 12 corresponding to a plurality of individual golf holes associated with the given course. Additional portions of the score card include a second portion 14 corresponding to a golf course identity and location, a third portion 16 corresponding to participant identity information (as well as further including date input and player attestation fields), and a fourth portion 18 which may optionally present a layout of the golf course holes to be played. Other and additional components of the score card may include a portion 20 dedicated to information such as slope and course ratings, as well as other portions dedicated to advertisement information and the like.

Figure 2:
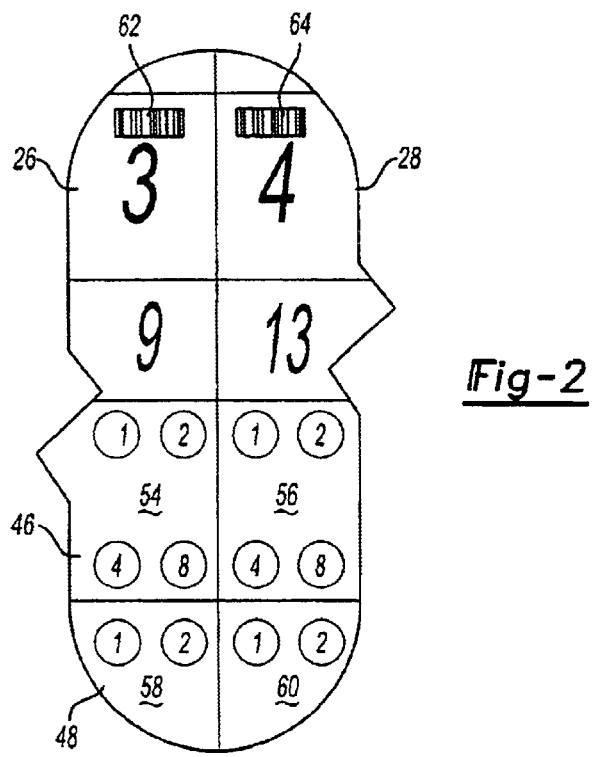
FIG. 2 is an enlarged partial view taken from FIG. 1 and illustrating a manner of scoring individual holes according to the present invention.
Figure 3:
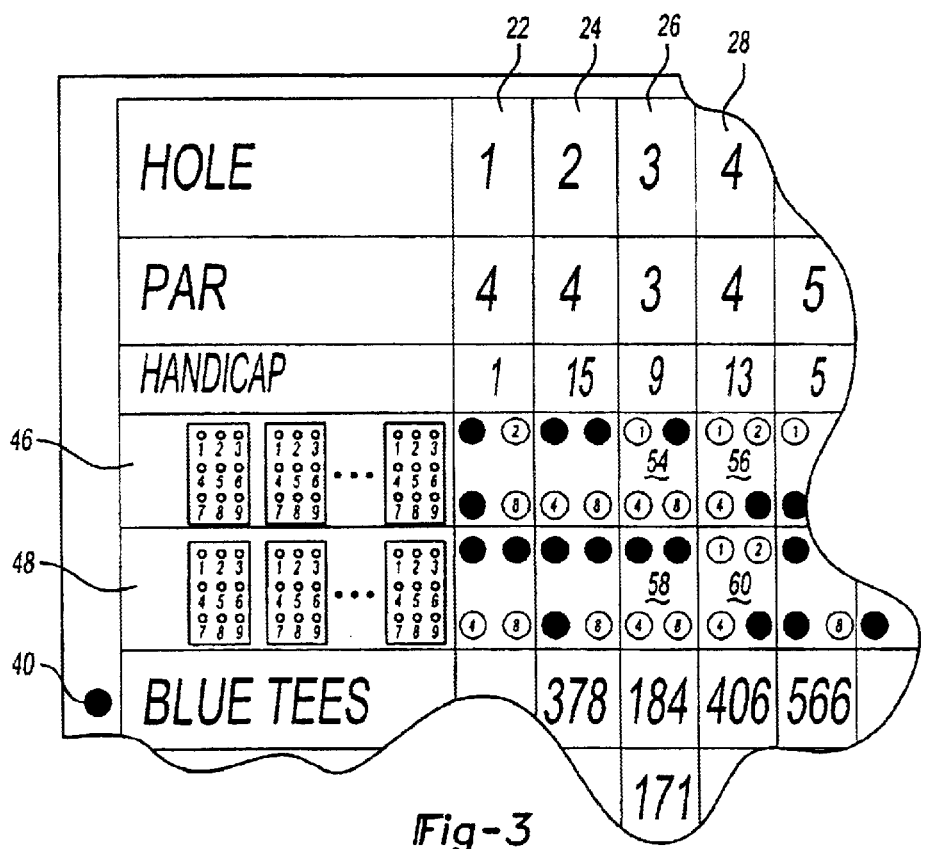
FIG. 3 is a sectional view of golf score card of FIG. 1 and demonstrating the manner in which the score card is filled out.

Referring once again to FIG. 1, as well as to FIGS. 2 and 3, the first portion 12 of the score card corresponds to a first plurality of inputtable fields and such as are illustrated by golfing holes 1–9 identified at 22, 24, 26, 28, 30, 32, 34, 36, and 38, respectively. Additional numerical representations, such as par and handicap, are assigned for each of the holes 22–38 and additional inputtable fields, illustrated at 40, 42 and 44, correspond to election of one of the "blue", "white" or "red" tees associated with the golf round. Inputtable fields 46, 48, 50 and 52 further reference each player's identity.

Each golfing hole 22–38 contains indicia inputtable information for establishing a subset score achieved on the given hole, for each player 46–52, or otherwise individual portion of the competition event. Such information is ideally recorded and inputted utilizing Scantron® type readable and recordable technology, however it is also envisioned that other and additional types of readable means, such as scored and removable chad portions or "scratch off" portions may be employed within the scope of the invention.

In the first preferred embodiment, and referencing in particular the enlarged partial view of FIG. 2, each of the first plurality of inputtable fields further is provided as a plurality of indicia imprintable and numerical representations corresponding to the golf course hole. Viewing holes three 26 and four 28, each includes, for player designations 46 and 48, indicia inputtable representations for the numerals "1", "2", "4", and "8" and further corresponding to each individual hole. As shown, individual sets of these designations are illustrated in FIG. 2 and at 54 and 56, for player 46 corresponding to holes 3 and 4, as well as at 58 and 60, for player 48 again corresponding to holes 3 and 4. It is further understood that additional and identical numerical schemes are illustrated for each hole associated with each player, therefore a repetitive identification of each is unnecessary.

Referring again now to FIG. 3, indicia imprinting, such as darkening one or more of the appropriate circles of a subset of the numerical representations, accomplishes the achieving of a tallied score for each of the plurality of fields. In this fashion, and taking for example again the scores of players 46 and 48 for holes three 26 and four 28, inputtable and numerical designation 54 corresponds to a score of two strokes by virtue of the circle corresponding to the number "2" being darkened. Designation 56 corresponds to a score of eight strokes by virtue of the circle corresponding to "8" being darkened. Designation 58 corresponds to a score of three strokes (again player 48 for hole 3) and by virtue of the circles corresponding to the numbers "1" and "2" both being darkened. Designation 60 corresponds to a score of either strokes (player 48, hole 4) and by virtue of only the circle corresponding to the number "8" being darkened. Although not specifically identified, other additional scorings referenced in FIG. 3 include any of 1, 2, 3 (by darkening circles 1 and 2), 4, 5 (by darkening circles 2 and 3), 6 (by darkening circles 2 and 4), 7 (by darkening circles 1, 4, and 7) and 8.

As further referenced in FIG. 2, each of the golf course holes may further include a bar code identifier symbol placed thereon. For example, bar code identifier 62 may correspond to hole number three 26 and additional bar code identified 64 to hole number four 28. It is further envisioned that an appropriate electro-optical reading device is capable of identifying each individual golf hole by virtue of its numerical representation alone, however it may be desired in certain instances to provide additional and confirmatory identification in the form of bar coding of the individual holes.

Referring again to FIG. 1, the score cord and inputtable scheme includes a second field associated with a golf course identity and location and which is again represented by portion 14 of the score card. In the preferred embodiment, the second field further typically provided as a bar code assigned to the golf course and which is immediately read by the appropriate opto-electrical device upon inputting the score card.

At least one third field is associated with a participant identity and includes again readable means for recording such as inputtable information for players 46, 48, 50 and 52.

Along these lines, and referencing once again FIG. 3, a plurality of individual and inputtable fields, potentially containing either or both alphabetical or numerical fields, may be used to enable each participant to quickly and effectively establish their identity to the readable system and such as by matching the inputted fields with a password code, such as interfacing with a look up table associated with the card reader processor technology, and in order to match the input to the assigned participant code.

Figure 5:
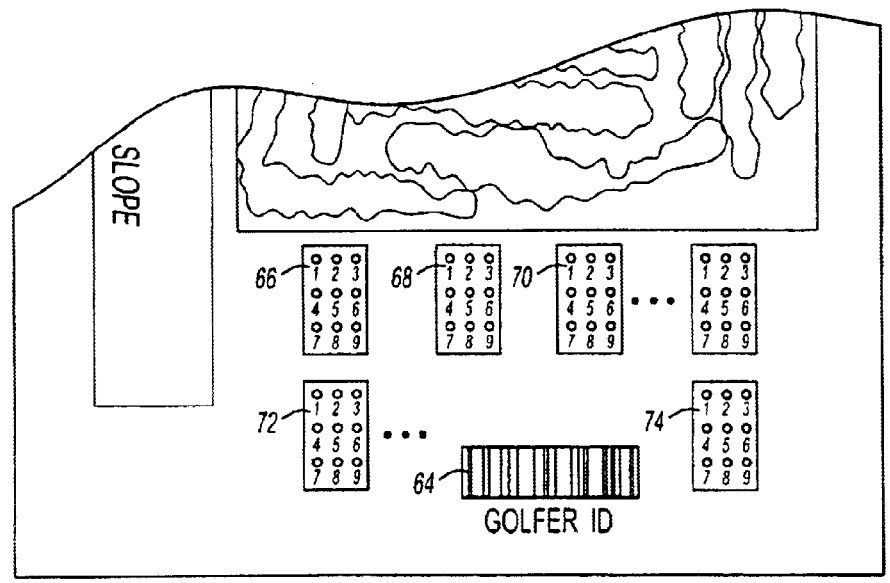
FIG. 5 is a sectional view of a golf score card according to a further preferred embodiment of the present invention and which illustrates the capability for the golfer to establish his identity utilizing either a bar code or alpha-numeric entry fields.

Referring to the alternate embodiment illustrated in FIG. 5, the capability of the golfer to establish his identity may utilize a bar code 64, such as in the event of an individual score card being issued for each golfer. In an alternate application, a plurality of alpha-numeric entry fields (see at 66, 68, 70, et seq., as well as at 72, 74, et seq.) may be provided and in order to enter such information as the date of play, the scorer for the golf card (usually the player but possibly another individual) and the identity of the person attesting to the score (see also portion 16 in FIG. 1).

Figure 4:
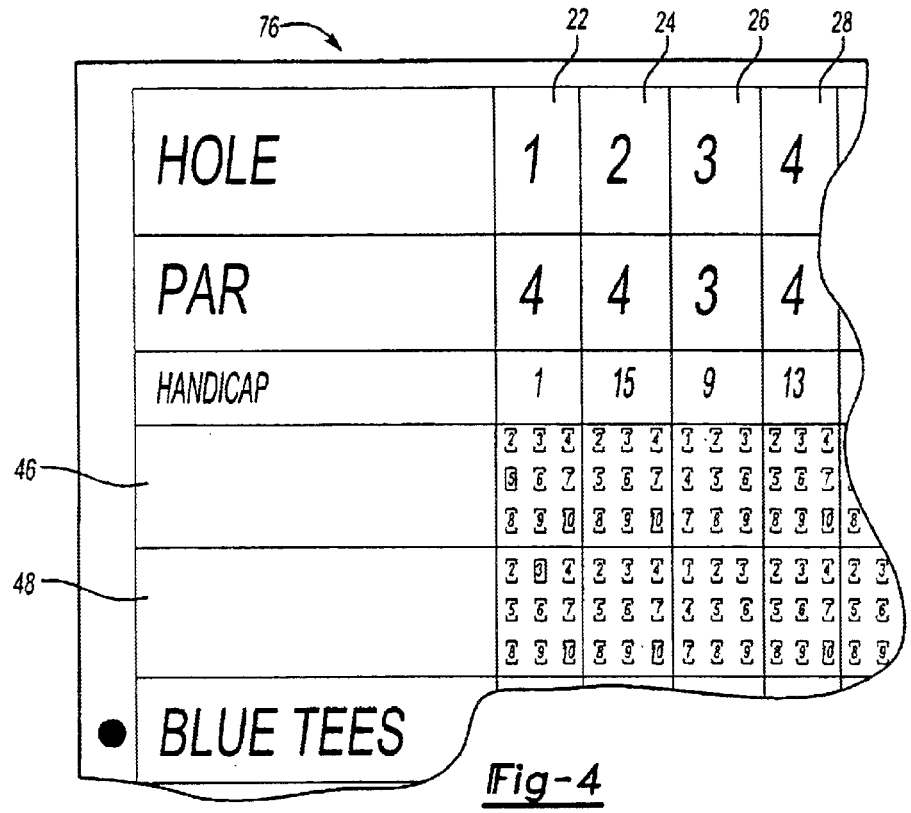
FIG. 4 is a sectional view similar to that shown in FIG. 3 and illustrating an alternate scheme for establishing a player's score for a given hole.

Referring finally to FIG. 4, an alternate scheme for establishing a player's score for a given hole is illustrated by score card portion 76 and which corresponds to portion 12 associated with the first preferred embodiment of FIGS. 1–3. In particular, individual fields associated with players 46 and 48 are illustrated and for each of the holes 22, 24, 26, et seq. As shown, each of the fields list each and all of subset fields 1, 2, 3, 4, 5, 6, 7, 8, 9, 10 for each given hole and as an alternative to the subset and cumulating fields of the variant, FIGS. 1–3. In the embodiment of FIG. 4, the participant elects to select (and darken or otherwise inscribe) a single one of the subset fields to designate the score for the given hole.

Having described my invention, additional preferred embodiments will become apparent to those skilled in the art to which it pertains, and without deviating from the scope of the appended claims. In particular, it is also envisioned that, in addition to golf, such a score card can be utilized for other types of events, such as in particular including bowling, as wall as any other sport in which it is necessary to input information into a corresponding entry fields, in the present instance the bowling frames replacing the golf holes in the fields indicated on the card.

I claim:

1. An inputtable and readable scheme for use with a score card utilized in combination with a competition event, said scheme comprising:
    a first plurality of inputtable fields, each of which corresponds to a subset score achieved in an individual portion of the competition event;
    at least one second field associated with an event identity and location, said at least one second field corresponding to a bar code assigned to said event identity and location; and
    at least one third field associated with a participant identity;
    the score card, upon completion of said first, second and third fields, being inputted into an appropriate and electro-optical card reader device for calculating the participant's score and handicap and for compiling and outputting such information for professional and amateur sporting events.

2. The score card scheme according to claim 1, said first plurality of inputtable fields each corresponding to an individual golf course hole.

3. The score card scheme according to claim 2, further comprising a fourth inputtable field associated with an overall yardage parameter associated with the golf course.

4. The score card scheme according to claim 2, each of the golf course holes, corresponding to said inputtable fields, further comprising a bar code identifier symbol placed thereon.

5. The score card scheme according to claim 1, each of said first plurality of fields further comprising a plurality of indicia imprintable and numerical representations, indicia imprinting of a subset of said numerical representations corresponding to an achieved score for each field.

6. The score card scheme according to claim 5, further comprising indicia imprinting of a plurality of each subset of numerical representations corresponding to a cumulative score achieved for each field.

7. The score card scheme according to claim 1, said at least one third field corresponding to a bar code assigned to said event participant.

8. The score card scheme according to claim 1, said at least one third field corresponding to a plurality of individual fields, each of which including at least one of alphabetic fields and numerical fields.

9. An inputtable and readable scheme for use with a score card utilized in combination with a golf course competition event, said scheme comprising:
    a first plurality of inputtable fields, each of which corresponds to an individual golf course hole;
    a second field associated with a golf course identity and location, said second field further comprising a bar code assigned to the golf course; and
    at least one third field associated with a participant identity;
    said score card, upon completion of said first, second and third fields, being inputted into an appropriate and electro-optical card reader device for calculating the participant's score and handicap and for compiling and outputting such information for professional and amateur sporting events.

10. A sporting event score card employing an inputtable and readable scheme for use in recording a plurality of informational objectives associated with the competition event, said score card comprising:
    a first plurality of inputtable fields, each of which corresponds to a subset score achieved on an individual portion of the competition event hole, each of said first plurality of inputtable fields further comprising a plurality of indicia imprintable and numerical representations, indicia imprinting of a subset of said numerical representations corresponding to an achieved score for each of said fields;
    a second field associated with a golf course identity and location, said second field further comprising a bar code assigned to the golf course; and
    at least one third field associated with a participant identity;
    said score card, upon completion of said first, second and third fields, being inputted into an appropriate and electro-optical card reader device for calculating the participant's overall score and handicap and for compiling and outputting such information for professional and amateur sporting events.

* * * * *